United States Patent Office 3,389,150
Patented June 18, 1968

3,389,150
4,17-DIOXA-A,D-BISHOMO-STEROIDAL LACTONE
Gerald W. Krakower, Elizabeth, N.J., assignor to E. R. Squibb & Sons, Inc., New York, N.Y., a corporation of Delaware
No Drawing. Filed Mar. 21, 1966, Ser. No. 535,677
1 Claim. (Cl. 260—343.2)

ABSTRACT OF THE DISCLOSURE

This disclosure relates to the compound 16$\beta$-acetoxy-4a$\alpha$,8,14-trimethyl-4,17-dioxa-A,D-bishomo - 18 - nor-5$\alpha$, 8$\alpha$,9$\beta$,13$\alpha$,14$\beta$-androstane-3,11,17a-trione, prepared by treating methyl 16$\beta$-acetoxy-3,11-diketo-4$\alpha$,8,14-trimethyl-18-nor-5$\alpha$,8$\alpha$,9$\beta$,13$\alpha$,14$\beta$-cholesta-17(20), 24-dien-21-oate with ozone followed by reacting the mixture thus formed with a perocidic acid. This compound possesses anti-androgenic and estrogenic activity.

---

This invention relates to and has as its object the provision of a new physiologically active steroid.

More particularly, this invention relates to 16$\beta$-acetoxy-4a$\alpha$,8,14-trimethyl-4,17-dioxa-A,D-bishomo - 18 - nor-5$\alpha$, 8$\alpha$,9$\beta$,13$\alpha$,14$\beta$-androstane-3,11,17a-trione.

The novel compound of this invention is a pharmacologically active substance which possesses anti-androgenic activity (i.e., it inhibits the actions of androgens), and which may be used in the treatment of such conditions as hyperandrogenic acne. It also possesses estrogenic activity.

The compound may be formulated for such administration, the concentration and/or dosage being based on the activity of the particular compound and the requirements of the patient.

The compound of this invention may be prepared according to the process of this invention beginning with 16$\beta$-acetoxy-4$\alpha$,8,14-trimethyl - 18- nor -5$\alpha$,8$\alpha$,9$\beta$,13$\alpha$,14$\beta$-androstane-3,11,17-trione. It has been discovered that by treating this starting material with a peracid such as perbenzoic acid, monoperphthalic acid or m-chloroperbenzoic acid in a suitable solvent such as chloroform, methylene chloride or benzene at a temperature of from 0 to 40° C. the product of this invention is formed.

Further, it has been discovered that ozonation of methyl 16$\beta$-actoxy-3,11-diketo - 4$\alpha$,8,14-trimethyl-18-nor-5$\alpha$,8$\alpha$,9$\beta$,13$\alpha$,14$\beta$-cholesta-17(20), 24-dien-21-oate followed by reacting the mixture thus formed with a peracidic acid as set forth above, the product formed is the compound of this invention. The starting compound of this procedure is prepared in accordance with the process described in copending application SN 535,719 filed in the patent office on the same date as this application.

The following examples illustrate this invention; all temperatures are in degrees centigrade unless otherwise stated:

Example 1. — 16$\beta$-acetoxy-4a$\alpha$,8,14-trimethyl-4,17-dioxa-A,D-bishomo - 18 - nor - 5$\alpha$,8$\alpha$,9$\beta$,13$\alpha$,14$\beta$-androstane-3,11,17a-trione A solution of 194 mg. of 16$\beta$-acetoxy-4$\alpha$,8,14-trimethyl-18-nor-5$\alpha$,8$\alpha$,9$\beta$,13$\alpha$,14$\beta$-androstane-3,11,17-trione and 345 mg. of m-chloroperbenzoic acid in 10 ml. of methylene chloride is kept in the dark at room temperature for sixty-five hours. The crystalline material which settles out of the solution (107 mg. of m-chlorobenzoic acid, M.P. 151–152° C.) is filtered and washed with benzene. The filtrate and washings are diluted with benzene and washed successively with 5% potassium iodide, 5% sodium sulfite, saturated sodium chloride, 5% potassium bicarbonate, and saturated sodium chloride solutions. After drying, the solvent is evaporated to give 200 mg. of residue, which on recrystallization from methanol gives 122 mg. of 16$\beta$-acetoxy-4a$\alpha$,8,14-trimethyl-4,17-dioxa-A,D-bishomo-18-nor - 5$\alpha$,8$\alpha$,9$\beta$,13$\alpha$,14$\beta$-androstane-3,11,17a-trione, M.P. 222–224° C. The analytical sample has M.P. 229–231° C., [$\alpha$]$_D$+21° (chloroform).

Analysis.—Calc'd for $C_{25}H_{35}O_7$: C, 65.69; H, 7.67. Found: C, 65.70; H, 7.73.

Example 2. — 16$\beta$-acetoxy-4a$\alpha$,8,14-trimethyl-4,17-dioxa-A,D-bishomo - 18 - nor - 5$\alpha$,8$\alpha$,9$\beta$,13$\alpha$,14$\beta$-androstane, 3,11,17a-trione A solution of one part (by weight) of 16$\beta$-acetoxy-3,11-dieto-4$\alpha$,8,14-trimethyl - 18 - nor - 5$\alpha$,8$\alpha$,9$\beta$,13$\alpha$,14$\beta$-cholesta-17 (20), 24-diene-21-oic acid or its methyl ester in twenty-five parts (by volume) glacial acetic acid is cooled to +10° C. A stream of oxygen containing 10 moles of ozone per mole of substrate is passed through this solution. Helium is then bubbled through the solution for thirty minutes and the acetic acid evaporated in vacuo. The residue is taken up in ethyl acetate and the solution washed with 5% sodium bicarbonate and water, dried and evaporated. The residue is recrystallized from methanol. The first crop consists of high melting 16$\beta$-acetoxy-4$\alpha$,8,14-trimethyl-17-oxa-D-homo - 18 - nor-5$\alpha$, 8$\alpha$,9$\beta$,13$\alpha$,14$\beta$-androstane-3,11,17a-trione. The latter crops consist of a mixture of this compound and 16$\beta$-acetoxy-4a,8,14-trimethyl-18-nor-5$\alpha$,8$\alpha$,9$\beta$,13$\alpha$,14$\beta$ - androstane - 3,11,17-trione.

A solution of 1.50 g. of this mixture, 2.67 g. of m-chloroperbenzoic acid in 37 ml. of methylene chloride is reacted and worked up as described in Example 1. From this reaction is obtained 842 mg. of 16$\beta$-acetoxy-4a$\alpha$,8,14-trimethyl-4,17-dioxa-A,D - bishomo - 18-nor-5$\alpha$, 8$\alpha$,9$\beta$,13$\alpha$,14$\beta$-androstane-3,11,17a-trione whose melting point and other physical properties are identical with those described in Example 1.

The invention may be variously otherwise embodied within the scope of the ground claim.

What is claimed is:

1. 16$\beta$,acetoxy-4a$\alpha$,8,14 - trimethyl - 4,17-dioxa-A,D–bishomo-18-nor-5$\alpha$,8$\alpha$,9$\beta$,13$\alpha$,14$\beta$ - androstane - 3,11,17a-trione.

References Cited

UNITED STATES PATENTS 3,101,349    8/1963    Pappo et al. _____ 260—345.2

JAMES A. PATTEN, *Primary Examiner.*